United States Patent [19]

Impink, Jr.

[11] Patent Number: 4,642,213
[45] Date of Patent: Feb. 10, 1987

[54] ANTICIPATORY CONTROL OF XENON IN A PRESSURIZED WATER REACTOR

[75] Inventor: Albert J. Impink, Jr., Murrysville Boro, Pa.

[73] Assignee: Westinghouse Electric Corp., Pittsburgh, Pa.

[21] Appl. No.: 635,373

[22] Filed: Jul. 27, 1984

[51] Int. Cl.[4] ............................................. G21C 7/36
[52] U.S. Cl. ..................................................... 376/218
[58] Field of Search ........................ 376/216, 217, 218

[56] References Cited

U.S. PATENT DOCUMENTS

| | | | |
|---|---|---|---|
| 4,057,463 | 11/1977 | Morita | 176/22 |
| 4,079,236 | 3/1978 | Graham et al. | 176/19 R |
| 4,170,516 | 10/1979 | Shinbo et al. | 376/217 X |
| 4,222,822 | 9/1980 | Mueller et al. | 176/20 R |
| 4,299,657 | 10/1981 | Abenhaim et al. | 376/217 |
| 4,318,778 | 3/1982 | Musick | 376/216 |

FOREIGN PATENT DOCUMENTS

53-27793 3/1978 Japan .
54-39795 3/1979 Japan .

*Primary Examiner*—Peter A. Nelson
*Attorney, Agent, or Firm*—Daniel C. Abeles

[57] ABSTRACT

Axially spaced measurements of the neutron flux in a pressurized water reactor are used to generate point-by-point signals representative of the core average xenon-135 axial distribution and the rate of change thereof. These signals may be used directly to generate visual displays representative of the xenon-135 distribution and/or can be used to generate a skewness signal representative of divergence of the xenon-135 distribution from the equilibrium, full power axial xenon-135 distribution and a rate of change of the skewness signal. A two dimensional comparison of the skewness and rate of change of skewness signals can be used in a xenon control mode of a wide band constant axial offset control system to automatically position the control rods to dampen the xenon transients. Simultaneously or alternatively, the skewness and rate of change of skewness signals can be applied to the orthogonal axis of a two dimensional visual display device to form a phase plane diagram so scaled and polarized that xenon-135 oscillations of constant amplitude trace a clockwise circular path on the display and lowering and raising of the control rods induce corresponding movement in the display trace. With such a display, the operator gains a clear, rapid understanding of the axial distribution of xenon-135 in the core, the need, if any, for corrective action, and the direction of rod movement required to effect such action.

26 Claims, 8 Drawing Figures

FIG. 1

FIG. 2 Xenon Concentration

FIG. 3 Rate Of Change Of Xenon Concentration

FIG. 4 Axial Power Distribution

ANTICIPATORY CONTROL OF XENON IN A PRESSURIZED WATER REACTOR

FIELD OF THE INVENTION

This invention relates to a method and apparatus for determining the pointwise axial distribution and rate of change of the pointwise axial distribution of xenon in the core of a pressurized nuclear reactor, for use in generating a display illustrating the xenon distribution and the trend in that distribution, and in an automated xenon mode control system which indirectly regulates axial power distribution.

PRIOR ART

In a nuclear power plant, fissile material is arranged in a reactor core such that fission reactions, produced by the bombardment of the fissile material with neutrons, release sufficient additional neutrons to maintain a sustained process. This process generates heat which is extracted by coolant circulated through the core and is utilized to generate steam for the production of electric power. The power level of the reactor is controlled by regulating the population of neutrons available for producing fission reactions. In the pressurized water reactor (PWR) the neutron density is controlled by neutron absorbing rods which are inserted into the core and by variable amounts of neutron absorbing material dissolved in the water which serves as the reactor coolant. Reactivity is also affected by the temperature of the coolant which acts as a moderator to slow the neutrons down to the energy levels compatible with the fission reactions.

A by-product of the fission reactions in the reactor core is xenon-135 which has a very large cross-section for neutron absorption and therefore imposes a large burden on the reactor. The xenon-135 is created primarily through beta decay of iodine-135 which in turn is, directly or indirectly, a product of fission, although a small amount of xenon-135 is also produced directly by fission. Due to the 6.7 hour half life of iodine, the build up of the xenon levels in the reactor lags an increase in power. The xenon-135 decays to benign daughters but with a half life of 9.2 hours so that at power, most of the xenon is transmuted to xenon-136, a harmless isotope, by neutron absorption, and under steady state conditions an equilibrium level of xenon-135 is achieved. When the power, and therefore the neutron flux, is reduced the xenon level rises substantially and remains at elevated values for several hours. This condition restricts the ability of the reactor to return to power after such a reduction and also frequently has an adverse effect on the distribution of power in the core.

The operation of the reactor is dependent not only upon the total amount of xenon present at any given time but also the spatial distribution of the xenon. Since the xenon is generated as a result of the fission process, the local concentration of xenon follows the spatial power distribution throughout the core. As the reactor returns to power following a power reduction, the local xenon concentration has an effect on the local neutron flux density and therefore the ability of each local section of the core to generate a share of the required load. If the spatial distribution of xenon-135 is not managed properly, hot spots can be created in parts of the core, which could result in damage to the fuel cell cladding, and therefore, a breach of the first barrier against the release of radiation.

Since the control rods are inserted and retracted vertically in the core, they have a direct effect on, and hence can be used to control, the axial distribution of power and therefore xenon. They are actuated in symmetrical groups so that any effect on radial power distribution is well within specified limits. Since inappropriate movement of the control rods can cause unacceptable distortion in the axial power, and therefore xenon distribution, it would be useful to have a system for automatically maintaining the axial distribution of xenon within limits or which would provide guidance to the operator to do so under manual control.

The axial power distribution in a reactor is measured in terms of the axial offset which is an index calculated as the difference in the power in the top and bottom halves of the core divided by the total power. The axial offset is measured using neutron flux detectors axially distributed along the core. Typically, excore detectors are used for this purpose but some installations measure the power using incore instruments. It is known to interpolate between detectors to generate a pointwise representation of the axial power distribution.

Each reactor has a target axial offset which is changed periodically during the fuel cycle. The common practice today is to operate the reactor to maintain the axial offset substantially constant. An example of such a method of operating a nuclear reactor while load following is disclosed in U.S. Pat. No. 4,057,463. In this approach control rod position is used to regulate the axial power distribution while reactivity is controlled by other rods and/or the soluable poison dissolved in the reactor coolant. A modification of this method described in U.S. Pat. No. 4,222,822 accommodates for rapid changes in load by a controlled reduction in core coolant temperature which, by effecting small power changes uniformly throughout the core, has no effect on the axial power distribution.

There is interest today in relaxing the requirements on maintaining a constant axial offset in order to eliminate the associated constraints imposed by such a control scheme on the operating envelope of the reactor. However, as yet, there have been no well-defined criteria for such operation to assure that the spatial distribution of xenon is not trending in a direction which will approach technical limits of the reactor, except for the judgment of the operator, which must necessarily under such circumstances be very conservative. A major difficulty in putting into effect such a strategy is dealing with transients in the xenon distribution. These transients include changes in global xenon distribution brought about by changes in power level and transients in the spatial distribution of xenon which occur at constant power levels before equilibrium in xenon is reached. During load following in which a pattern of load changes is made, typically on a 24-hour cycle, the xenon never reaches equilibrium, and hence xenon transients are continuously present. It has previously been suggested that a delta iodine term could be plotted on a phase plane diagram versus a delta flux term to provide information useful to an operator in controlling axial power distribution, but a practical application of this concept has never heretofore been developed.

SUMMARY OF THE INVENTION

In accordance with the invention, signals are generated representative of the trend in the spatial distribution of xenon-135 in the core of a pressurized water reactor from measurements of the axial distribution of neutron flux. The trend signals which are a measure of skewness calculated as the difference for the top half and bottom half of the core of the pointwise difference between the actual xenon-135 distribution and the distribution of full power equilibrium xenon, normalized to the distribution at equilibrium at 100% power, and the normalized rate of change of skewness, are used in a xenon mode control system to reduce the magnitude of xenon-135 transients including dampening of the free-running xenon-135 oscillations. These skewness and rate of change of skewness signals can also, or alternatively, be used to generate a clear uncomplicated visual indication to the operator of the trend in xenon-135 distribution, whether corrective action is desirable and, if so, what to do. The display plots skewness increasing to the left on the abscissa and rate of change increasing in the downward direction on the ordinate, and scaled such that free-running oscillations trace a circle on the display and insertion of the rods moves the trace downward while withdrawal raises it.

Other displays may also be generated for presenting to the operator information useful in understanding the condition of the reactor core and trends in significant core parameters. For instance, a visual representation of the pointwise current xenon-135 concentration can be presented and can be superimposed over the full power, all rods out, equilibrium xenon-135 distribution. Also the rate of change of xenon-135 concentration at successive elevations in the core can be presented to the operator. The iodine concentrations and rates of change can be similarly presented if desired. Another useful presentation displays current axial power distribution at some selected time in the past for comparison purposes. These various displays may also include the position of the control rods to assist the operator in evaluating the situation and making a decision as to whether action should be taken and, if so, what to do.

BRIEF DESCRIPTION OF THE DRAWINGS

A full understanding of the invention can be gained from the following description of the preferred embodiments taken in conjunction with the accompanying drawings in which.

DESCRIPTION OF THE PREFERRED EMBODIMENT

Figure 1:
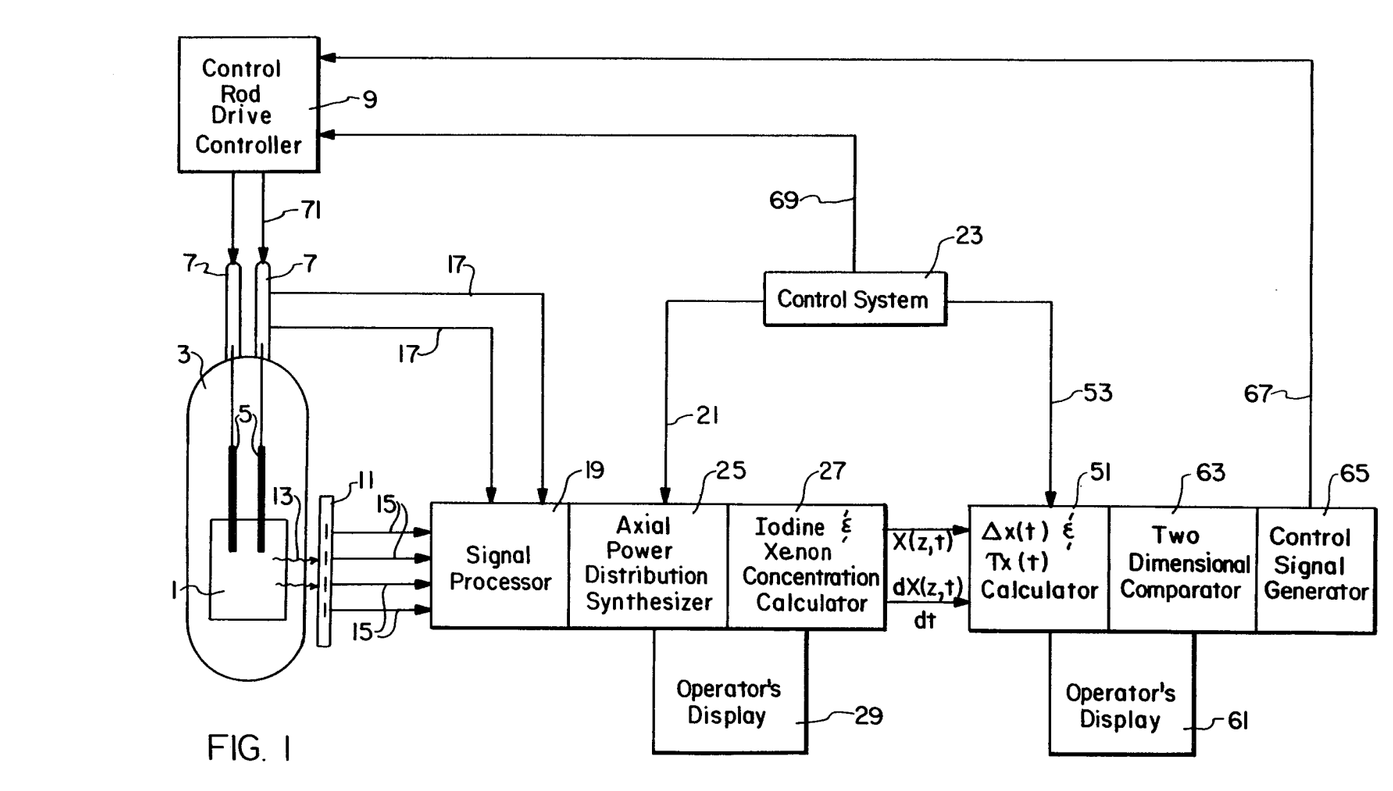
FIG. 1 is a schematic diagram of a pressurized water reactor nuclear power plant incorporating the present invention.

FIG. 1 illustrates in block diagram form a pressurized water reactor (PWR) nuclear power plant which operates in accordance with the teachings of the invention. The PWR includes a core of fissile material contained in a reactor vessel 3 with control rods 5 positioned within the core 1 by rod drives 7 under the control of control rod drive controller 9. A multisection excore detector 11 measures the neutron flux 13 escaping from the core 1 at, for example, 4 levels along the longitudinal axis of the core 1 which is generally cylindrical in configuration. An excore detector system is shown since that is the most prevalent in the field; however, incore neutron detectors can be used where available.

The neutron flux signals 15 generated by the multisection detector 11 are applied along with control rod position signals 17 to a signal processor 19 which applies appropriate scaling, compensation, surge control, isolation and buffering to the raw signals. The processed signals are applied along with compensating and normalizing temperature and power signals 21 generated by the reactor control system 23 to an axial power distribution synthesizer 25 which generates a pointwise profile of the radially averaged, axial power distribution in the core using known techniques such as those taught in U.S. Pat. No. 4,079,236. These techniques include generation of power density signals at a number of axially displaced levels by interpolation. In general terms, the power density at at least about 18 levels should be calculated with about 24 levels providing reasonably good definition and about 40 levels being preferred. Generally, finer interpolation than this does not provide proportionally better results.

From the pointwise axial power distribution, the pointwise iodine and xenon concentrations are generated in the Iodine and Xenon Concentration Calculator 23 based upon the following well-known differential equations which describe the transient behavior of iodine-135 and xenon-135 at any point in the core of a thermal nuclear power reactor:

$$\frac{dI(z,t)}{dt} = \phi(z,t)\Sigma_f(z)y_I - \lambda_I I(z,t) \tag{1}$$

and $$\frac{dX(z,t)}{dt} = \phi(z,t)\Sigma_f(z)y_x + \lambda_I I(z,t) - \phi(z,t)\sigma_a^x(z)X(z,t) - \lambda_x X(z,t) \tag{2}$$

where
- $I(z,t)$ = current number density of iodine-135 atoms per cubic centimeter at level z in the core
- $X(z,t)$ = current number density of xenon-135 atoms per cubic centimeter at level z
- $\phi(z,t)$ = current neutron flux density at level z
- $\Sigma_f(z)$ = the macroscopic fission cross-section at level z
- $Y_I$ = iodine-135 fission yield fraction
- $Y_x$ = xenon-135 fission yield fraction
- $\lambda_I$ = decay constant for iodine-135
- $\lambda_x$ = decay constant for xenon-135
- $\sigma_a^x(z)$ = microscopic absorption cross-section for xenon-135 at level z.

In equation (1) the first term to the right of the equal sign is the rate of formation of iodine-135 by fission and the second term is the rate of decay of iodine-135. In equation (2), the first term represents the rate of formation of xenon-135 by fission, the second is the rate of formation of xenon-135 by decay of iondine-135, the third is the rate of transmutation of xenon-135 to xenon-136 by neutron absorption, and the last term is the rate of decay of xenon-135.

For convenience in use in the present invention, the following transformations are made:

$$q(z,t) = M\phi(x,t)\Sigma_f(z) \tag{3}$$

where:

$q(z,t)$ = current core average axial lineal power density (Kw/ft) at level z

M = a constant and substituting equation (3) into the iodine equation, one obtains:

$$\frac{dI(z,t)}{dt} = q(z,t)\frac{y_I}{M} - \lambda_I I(z,t) \tag{4}$$

and $$\frac{1}{\lambda_I} \cdot \left[ M \frac{\lambda_I}{y_I} \right] \frac{dI(z,t)}{dt} = q(a,t) - \left[ M \frac{\lambda_I}{y_I} \right] I(z,t) \tag{5}$$

We now define $$\hat{I}(z,t) = \frac{M\lambda_I}{y_I} I(z,t) \tag{6}$$

where:

$\hat{I}(z,t)$ = current scaled iodine concentration at level z and obtain $$\frac{1}{\lambda_I} \cdot \frac{d\hat{I}(z,t)}{dt} = q(z,t) - \hat{I}(z,t) \tag{7}$$

Thus, at equilibrium, the scaled iodine concentration, $\hat{I}(z)$, at any point in the core has the same magnitude as $q(z)$, the lineal power density at that point.

With the same lineal power density substitution, similar manipulations, and by defining:

$$\hat{X}(z,t) = \left[ \frac{M\lambda_x}{y_I} \right] X(z,t) \tag{8}$$

the xenon equation (2) becomes:

$$\frac{1}{\lambda_x} \cdot \frac{d\hat{X}(z,t)}{dt} = q(z,t)\left[\frac{y_x}{y_I}\right] + \hat{I}(z,t) - \left\{ q(z,t)\left[\frac{\sigma_a^x(z)}{\lambda_x M \Sigma_f(z)}\right] + 1 \right\} \hat{X}(z,t) \tag{9}$$

Finally, the quantity $$\frac{\sigma_a^x(z)}{\lambda_x M \Sigma_f(z)}$$

is replaced by a single parameter, N, to obtain $$\frac{1}{\lambda_x} \cdot \frac{d\hat{X}(z,t)}{dt} = q(z,t)\left[\frac{y_x}{y_I}\right] + \hat{I}(z,t) - \{1 + q(z,t)N(z)\}\hat{X}(z,t) \tag{10}$$

where $y_x/y_I$ is the ratio of the xenon-135 yield fraction to the iodine-135 yield fraction. This ratio is always small and is weakly dependent on the fuel ratio in the core at any given time. The parameter N characterizes the ratio of the xenon burnout rate at full power to its decay rate. Although the value of N can in principle be calculated, it is usually more convenient to treat N as an empirical constant that is used to match calculated xenon transients to observed transients. The N parameter has a weak dependence on core elevation as a result of the dependence of $\Sigma_f$ on core location caused by burnup. However, experience has shown that ignoring the spatial dependence of N introduces little error into the calculated xenon axial distribution.

Since the update cycle for the axial power distribution display is very short (on the order of once per minute) compared to the half lives of iodine-135 and xenon-135, integration of the iodine and xenon equations [(7) and (10)] can consist of no more than:

$$\hat{I}(z, t + \Delta t) = \hat{I}(z,t) + \left\{ \frac{d\hat{I}(z,t)}{dt} \right\} \Delta t \tag{11}$$

and $$\hat{X}(z, t + \Delta t) = \hat{X}(z,t) + \left\{ \frac{d\hat{X}(z,t)}{dt} \right\} \Delta t \tag{12}$$

It should be appreciated that operational experience with multisection excore detectors has shown that at core power levels below some minimum value (typically, on the order of twenty-five percent of rated power) significant fractional errors may occur in the axial power distribution synthesized in block 25. The values of the absolute errors in lineal density (the q's noted above) will remain small, however, and so the updating of the values of the axial distribution of xenon concentration can be expected to proceed without accumulation of significant error. When the reactor is at zero power or is shutdown, it is appropriate simply to set the values of q(z) equal to zero at all core elevations.

The pointwise distributions of axial power generated in synthesizer 25 and of iodine and xenon concentrations and the rates of change of those concentrations generated in calculator 27 can be used to generate a number of useful operator displays as indicated at block 29. It has already been proposed to display the pointwise axial power distribution made available by the prior art. It has been suggested that such a display could include the "LOCA" (loss of coolant accident) limits for the axial power distribution so that the operator could evaluate present conditions as compared with the limiting value.

Figure 2:
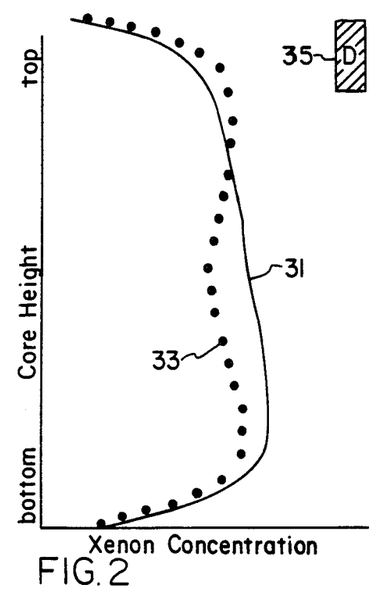
FIGS. 2 through 7 are diagrams illustrating various visual displays that can be generated in accordance with the teachings of the invention.

The present invention makes possible several useful additional displays. For instance, as shown in FIG. 2, the current core average axial distribution (in relative units) of xenon-135, shown in solid line segments 31, can be displayed along with the reference, full power, all rods effectively out, equlibrium xenon-135 distribution (in the same units) shown as discrete dots 33. The position 35 of the D bank of control rods can also be displayed. By comparing the current xenon distribution with the reference distribution, the operator can readily determine, for example:

(1) the direction of, and (qualitatively) the amount of, the distortion in the current axial power distribution that is the result of nonequilibrium xenon, and (2) the degree to which nonequilibrium xenon is effecting the overall core reactivity balance.

Figure 3:
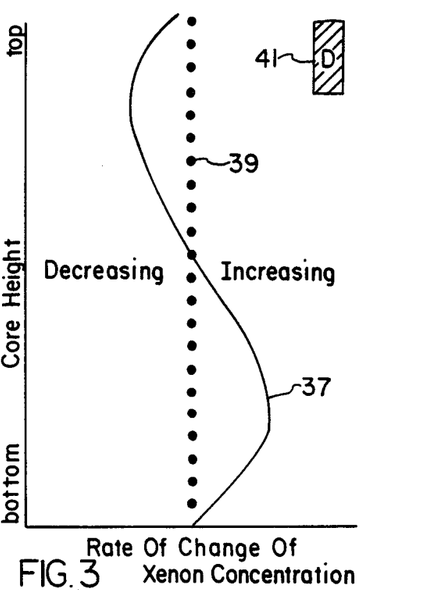

A second display, illustrated in FIG. 3, shows the rate of change of xenon-135 concentration (in relative units) at successive elevations in the core, in solid line segments 37, referenced to a zero rate of change ordinate, as shown as discrete dots 39. Again, the position 41 of the D bank of control rods can also be presented on the display. This rate of change of xenon-135 concentration display allows the operator to determine, for example:

(1) how the axial xenon distribution and, by inference, how the axial power distribution will change in the near future if the current power level and control rod configuration do not change significantly;

(2) how effective recent or ongoing control actions to stabilize or suppress an existing xenon spatial transient have been or are (i.e. are the rates of change of xenon-135 concentration decreasing in the absolute sense in both the top and bottom of the core?); and (3) how rapidly the core reactivity balance is changing as a result of transient xenon-135 and, again by inference, approximately what compensating changes in control rod position and/or soluble boron concentration or other control mechanism, such as for example gray rods in an advanced pressurized water reactor (APWR), will be necessary in the near future.

Figure 4:
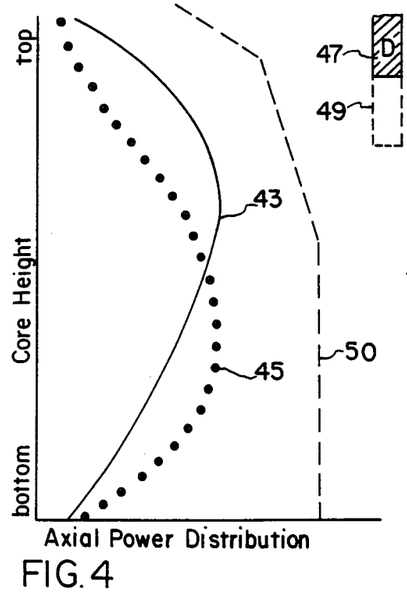

A third display made possible by the invention and illustrated in FIG. 4 shows, in solid line segments 43 and on an expanded scale, the differences (in units of kilowatts per foot) between the current values of the core average axial power distribution at successive elevations in the core and the corresponding values, shown as discrete dots 45, that existed at any specified number of minutes in the past (for instance in the range of about 5 to 30 minutes in the past). The present position 47 of the D bank of control rods and their position 49 at the specified time in the past may also be displayed. If desired, limits, such as for example the LOCA limits illustrated by the dashed line segments 50 in FIG. 3, can be provided on the displays to provide the operator with a visual indication of the margin between the current and limiting value of the selected parameter.

It is to be noted that displays comparable to those shown in FIGS. 2 and 3 could readily be generated to show current and reference iodine-135 axial distributions and the rate of change of iodine-135 concentration at successive elevations in the core.

While the displays of FIGS. 2 through 4 provide useful information to the operator, I have found that signals generated in the iodine and xenon concentration calculator 27 of FIG. 1 can be utilized to generate more meaningful displays illustrating the trends in xenon distribution and which also provide a clear indication of when control action should be taken, what that action should be, and the response to that action. Accordingly, as shown in FIG. 1, the pointwise current xenon-135 concentration signals $X(z,t)$ and the associated rate of change signals $dX(z,t)/dt$ are applied to a trend calculator 51 which generates signals representative of two new modal quantities:

$$\Delta_x(t) = \frac{\sum_{\text{top half of core}} [X(z,t) - X(z,e)] - \sum_{\text{bottom half of core}} [X(z,t) - X(z,e)]}{\sum_{\text{entire core}} X(z,e)} \quad (13)$$

and $$\dot{\Delta}_x(t) = \frac{\sum_{\text{top half of core}} \frac{dX(z,t)}{dt} - \sum_{\text{bottom half of core}} \frac{dX(z,t)}{dt}}{\sum_{\text{entire core}} X(z,e)} \quad (14)$$

where:

$X(z,t)$ and $dX/dt$ are current (transient) pointwise values $X(z,e)$ are the pointwise normalized values of equilibrium xenon-135 concentration under full power, bank-D-at-bite limit, etc. conditions.

In a more general form these modal quantities could be represented as:

$$\Delta_x(t) = \frac{\sum_{\text{entire core}} [X(z,t) - X(z,e)] W(z)}{\sum_{\text{entire core}} X(z,e)} \quad (15)$$

and $$\dot{\Delta}_x(t) = \frac{\sum_{\text{entire core}} \left[\frac{dX(z,t)}{dt}\right] W(z)}{\sum_{\text{entire core}} X(z,e)} \quad (16)$$

where the term $W(z)$ are pointwise weighting factors. With the specifications:

$W(z) = -1.0$ at all locations in the bottom half of the core, and $W(z) = +1.0$ at all locations in the top half of the core, it can be seen that these more general representations are identical to the more specific forms given earlier. Another form of weighting factor that might be of interest is a cosine form:

$$W(z) = \cos(\pi z/Z) \quad (17)$$

where Z is the total core height. However, for purposes of description here, the simple unity step function form for $W(z)$ will be used.

It has proven desirable to convert the $\dot{\Delta}_x(t)$ parameter to a compensated trend parameter of the form:

$$T_x(t) = c\{\dot{\Delta}_x(t) + \mu[T_{avg.}(t) - T_{avg.}^{program}]\} \quad (18)$$

where C and $\mu$ are empirical constants that need not be of high precisions. The C multiplier serves as a scaling factor such that the phase plane plot to be described below has an approximately circular appearance. The $\mu$ factor smooths out the small irregularities in the plot that arise from the effect of coolant temperature changes on the axial power profile. The average current temperature and programmed temperature are obtained from the control system 23 over lead 53.

The significance of these two modal parameters is the following:

$\Delta_x(t)$ is a measure of the degree of "skewness" that exists in the current axial distribution of xenon-135 concentration when compared to the equilibrium full power, rods-at-withdrawal-limit axial distribution. "Skewness" at the xenon axial distribution yields a proportionate degree of skewness of opposite sign in the axial power distribution compared to the equilibrium axial power distribution obtained under full power, rods-at-withdrawal-limit conditions.

$T_x(t)$ is a measure of the rate at which the "skewness" in the xenon axial distribution is changing as a result of locally varying rates of production of xenon by iodine decay and direct fission yield and of destruction by xenon decay and neutron absorption. Knowledge of the current value of $T_x(t)$ permits projection of the value of $\Delta_x(t)$ into the near future and assessment of the degree of skewness that will exist in the axial power distribution at times in the near future.

Figure 5:
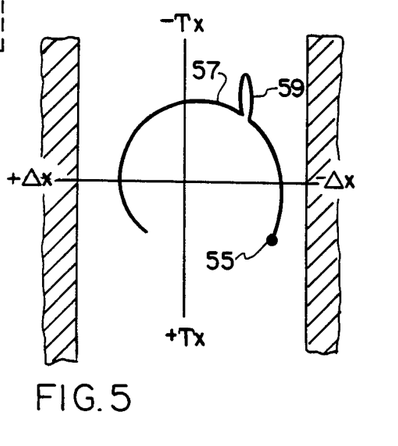

For conceptual purposes we can consider a graphical representation of the present and near future status of the axial distribution of xenon in a PWR core (and, by reference, of the axial power distribution in the near future) constructed in the form shown in FIG. 5, which presents both the present [$\Delta_x(t)$, $T_x(t)$] point 55 and the locus 57 of such points for the past 12 to 24 hours.

This phase plane representation of xenon modal status has the properties that:

(1) The locus of the [$\Delta_x(t)$, $T_x(t)$] points will appear as a clockwise spiral (converging or diverging a depending on the core stability characteristics) when a free running axial xenon oscillation is occurring. An oscillation of constant amplitude would trace a circle.

(2) Insertion of control rods moves the current [$\Delta_x(t)$, $T_x(t)$] point downward on the display (the xenon skewness will be shifted in the near future to being tilted more toward the top half of the core or less toward the bottom half of the core than would occur under a free-running oscillation). Conversely, withdrawal of control rods moves the current point upward on the display (the skewness will become tilted less toward the top half or more toward the bottom half of the core). The net effect of control rod movement on the behavior of a typical xenon skewness in the hours before and after the control rods are moved would appear as shown by the traces 57 in FIG. 6 for rod insertion and FIG. 7 for rod withdrawal.

(3) The domains in which power peaking problems are encountered under full power, rods-near-bite-limit conditions appear as the shaded areas in the display of FIG. 5. The boundaries of the domains can be determined either analytically or empirically (by correlatig the $\Delta_x(t)$ component of the plot with the LOCA limit 50 displayed in FIG. 4).

(4) Load changes tend to appear as relatively narrow vertical loops. An example of such a change in load is shown by the loop 59 in FIG. 5.

The phase plane representation contains within it information such as:

(1) Whether the current trajectory of the spiral, when projected, indicates that power peaking problems are likely to be encountered in the near term with the plant at full power, if no control actions are taken.

(2) Whether beneficial control actions can be taken at present. If the current point is in the top half plane and control rods are at the insertion limit, or if the current point is in the bottom half plane and control rods are at the withdrawal limit, no useful control action involving only control rod movement can be taken.

(3) How effective recently completed control rod movement has been, in terms of limiting the severity of potential power peaking or of limiting the xenon skewness that could prejudice future plant maneuvers, and how effective further control rod movement would be, if continued. Experience thus far has indicated that rod movement that forces the current point across the horizontal axis is almost always not beneficial.

(4) When future control rod movement would be most effective to limit potential power peaking. Control rod movement when $T_x(t)$ is small compared to $\Delta_x(t)$ is much less useful than the same movement when $T_x(t)$ is large compared to $\Delta_x(t)$. Expressed differently, when can a commitment of change in boron concentration be made most productive.

It is apparent that a human operator could readily assimilate and utilize the available information if the phase plane plot of $\Delta_x(t)$ vs. $T_x(t)$ were presented in the form of, for example, a graphical display 67 in the vicinity of the reactor operator's control panel. Physically, the operator's displays 29 and 67 would typically utilize common hardware.

Also of direct interest here is the use of the $\Delta_x(t)$ and $T_x(t)$ parameters in an automatic axial power distribution control system. It has proven to be feasible to predefine a xenon mode control strategy and to develop a control system based on the use of the $\Delta_x(t)$ and $T_x(t)$ parameters and their interrelationship and directed toward actively controlling the axial distribution of xenon-135 concentration in order to limit the degree of distortion in axial power distribution that results from xenon distribution "skewness". The control system has been implemented in digital form as a component of a digital simulation of typical PWR cores and the associated control systems and its performance has been verified both for the current advanced pressurized water reactor APWR core design and for an operating conventional PWR. The essence of the xenon mode control system consists of:

(1) initially, establishing a set of control target lines and active control regions in the [$\Delta_x$, $T_x$] domain, and (2) thereafter (a) computing at short time intervals the current values of the $\Delta_x(t)$ and $T_x(t)$ parameters as deduced (ultimately) from the values of excore nuclear detector responses with the algorithms either described or referred to above.

(b) identifying the location of the current point [$\Delta_x(t)$, $T_x(t)$] in the [$\Delta_x$, $T_x$] domain with respect to the control target lines and the active control regions previously established, and (c) initiating control rod movement, when appropriate and when physically possible, as dictated by the location of the current [$\Delta_x(t)$, $T_x(t)$] point with respect to the control target lines.

The proposed control system applies the $\Delta_x(t)$ and $T_x(t)$ signals to a two-dimensional comparator 63 as shown in FIG. 1. The resultant signal is used by a control signal generator 65 to supply a xenon mode control rod insertion/withdrawal requirement signal 67 to the control rod drive controller 9. The controller 9 uses this signal, along with a similar signal 69 from the control system 23 which represents the rod insertion/withdrawal requirements for other control functions, to generate control rod movement control signals 71 for the control rod drives 7.

Figures 6, 7, 8:
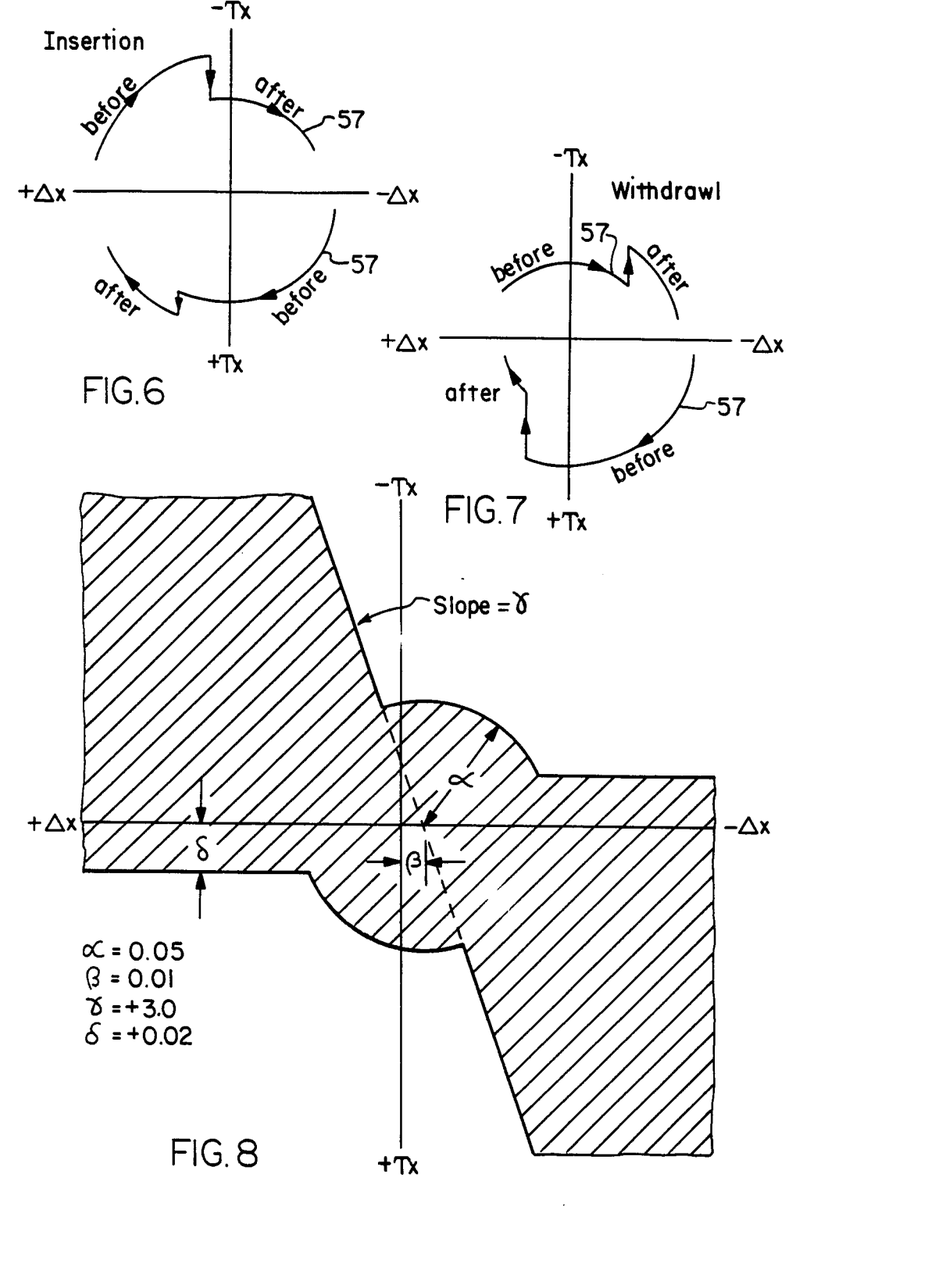
FIG. 8 is a diagram illustrating typical control target lines and active control regions for an automatic xenon mode control system according to the invention which can also be used as an overlay on a visual display.

A typical control target line and active control region arrangement in the [$\Delta_x$, $T_x$] domain that has proven suitable for both the APWR and a typical 4-loop PWR is sketched in FIG. 8. Use of this target line-control region arrangement in the [$\Delta_x$, $T_x$] domain for xenon mode control is quite straightforward. If the current [$\Delta_x(t)$, $T_x(t)$] point lies anywhere in the shaded area, no active control is necessary. If the current point lies in an unshaded (active control) region, the point should be shifted up or down, as appropriate, to the nearer control line which forms the intersection of the shaded and unshaded regions. Provided the controlling rod bank is properly positioned initially, insertion of the controlling bank (by boron dilution, for example) will cause the current [$\Delta_x(t)$, $T_x(t)$] point to move downward and withdrawal of the controlling bank (by boron addition) will cause the current point to move upwards. By tracking the locus of recent $[\Delta_x(t),T_x(t)]$ points and projecting their indicated future path the direction and, within limits, the timing of the next control action can be anticipated and appropriate actions taken in supporting systems. Realignment of the system which controls boron concentration in the reactor coolant, if in use, is a typical example of such anticipatory actions.

From FIG. 8 it is evident that the four parameters $(\alpha,\beta,\gamma,\delta)$ are sufficient to fully specify the locations of the control target lines and the active control regions in the $[\Delta_x,T_x]$ domain. The logic incorporated in defining the control target lines and regions makes use of the following considerations:

(1) If axial power distribution problems that would arise from xenon axial distribution skewing are to be minimized or fully avoided, the potential for developing severely skewed xenon distributions must be limited.

(2) If the current $[\Delta_x(t),T_x(t)]$ point lies near the origin $(0, 0)$ in the $[\Delta_x,T_x]$ domain, current xenon skewness is small ($\Delta_x(t) \approx 0$) and no potential currently exists ($T_x(t) \approx 0$) for developing severe skewness in the near future; therefore, no active control is necessary.

(3) If the current $[\Delta_x(t),T_x(t)]$ point lies in the shaded region of either the upper left or lower right quadrant, xenon skewness is decreasing naturally ($\Delta_x(t)$ and $T_x(t)$ have opposite signs) and no active control is necessary.

(4) If the current point lies in the unshaded region of either the upper left or lower right quadrant xernon, skewness is currently not large but the potential for developing a large degree of skewness in the opposite direction in the near future is present and active control by control rod movement to reduce that potential (i.e., to reduce the absolute value of $T_x(t)$) to limit the growth of the future xenon axial imbalance should be initiated.

(5) If the current point lies in the unshaded region of either the upper right or lower left quadrant, xenon skewness will become more severe in the near future ($\Delta_x(t)$ and $T_x(t)$ have the same sign) and so active control to limit the rate of growth, and therefore the final amount of xenon skewness, by control rod movement should be initiated.

(6) If the current point lies in the relatively narrow shaded band near the $\Delta_x$ axis in either the upper right or lower left quadrant, the degree of xenon skewness is near its limit for the immediate future. Since overcontrol, i.e., control that results in a change of sign for the value of $T_x(t)$, usually further destabilizes the iodine-xenon-flux relationship, active control will not be very productive and could be counterproductive and should not be initiated.

(7) Finally, if the equilibrium axial power distribution under full power, rods-at-withdrawal-limit conditions shows a preferential shift toward the top or the bottom of the core, offsetting the center of the target line-control region arrangement laterally from the origin by a small amount in the direction of the shift will have the effect, during plant maneuvers such as load follow, of using xenon-135 as a burnable poison to suppress power peaking during periods of full power operation.

The selection of the actual values of the parameters $(\alpha,\beta,\gamma,\delta)$ to be used in a given application has been done thus far empirically, although analytical techniques may exist that would facilitate the process. It has been observed that the values of the defining parameters for APWR and for conventional PWR applications tend to be quite similar. An exemplary set of values for these parameters is shown in FIG. 8.

As a preliminary demonstration of the usefulness of this approach to Xenon Mode Control in PWRs, a digital one dimensional, two group, diffusion theory model of a typical operating conventional PWR core together with digital models of the appropriate control systems was used to simulate a typical load following operation at two different stages of burnup under conventional Constant Axial Offset Control (CAOC) with both SPINR and MINB strategies and under the proposed Xenon Mode Control approach within a wide band CAOC context. SPINR and MINB strategies are methods of constant axial offset control which, respectively, maximize spinning reserve to emphasize the ability of the plant to accept increases in load, and minimize boron concentration changes which reduces the duty on the system which is required to recycle coolant discharged from the reactor coolant system as a result of boration or dilution. It has been found that xenon mode control strategies are most effective if deep insertion of control rods into the core is avoided. In the simulations of the conventional CAOC strategies, the control rod control system was modeled with a 43.9% overlap of control bank C on Control bank D and with a D bank insertion limit varying from 22% at full power to 78% at half power. In the xenon mode control simulations, the overlap was 75% and the insertion limit varied from 22% to 47%. In all simulations control was fully automatic.

The results obtained in the several simulations are listed in Table 1 for the middle of the fuel cycle and Table 2 for the end of the cycle. In these tabulations "Loss of Capacity" measures the ability of the reactor under the conditions of the respective simulations to meet the energy production schedule (the 12-3-6-3, 100%-50%-100% sequence) over a 3-day period. "Loss of Capacity" is measured in terms of effective full power hours (EFPH). "Average Rapid Return to Power Capability" is related to the ability of the unit to return from a reduced power level to full power at a rapid rate and in this case is the average over the three day period of the power levels that could have been attained by increasing power at the rate of 5%/minute over all times during reduced power operation. "Minimum Margin" is the minimum clearance that occurred between axial power profile, corrected for radial power peaking, and the LOCA limit among all core elevations throughout all operations at 100% power. "Maximum $F_Z$" is the maximum value of the axial power peaking factor that occurred during all periods of operation at 100% power. "Rod Steps" is the accumulated number of steps that would be made by the bank-D rod drive mechanisms during the three day period of load follow. Finally, "Discharged Water" is the total volume of water in the three day period that would have to be removed from the RCS (reactor coolant system) and eventually reprocessed as a result of dilution and boration operations during load follow maneuvers.

As is evident in the tables, compared to the conventional Constant Axial Offset Control approach, fully automated Xenon Mode Control, as described above, yields:

(1) Loss of Capacity—the same as MINB (both zero) and better than SPINR (2) Average Rapid Return to Power Capability—Nearly equivalent to SPINR and better than MINB (3) Axial Power Peaking (measured in terms of both Minimum Margin and Maximum $F_Z$)—lower than either SPINR or MINB (4) Rod Steps—significantly fewer than required by either SPINR or MINB (5) Discharged Water—less than either SPINR or MINB, especially later in the cycle.

TABLE I

| | Results of Load Follow Simulations at Middle of Fuel Cycle | | | |
|---|---|---|---|---|
| | Reference (equilibrium) | CAOC (SPINR) | CAOC (MINB) | Wide Band CAOC Xe Mode Control |
| Loss of Capacity | | 0.025 EFPH | 0 EFPH | 0 EFPH |
| Average Rapid Return to Power Capability | | 90% | 84% | 90% |
| Minimum Margin @ 100% | 0.228 | 0.022 | 0.046 | 0.090 |
| Maximum $F_z$ @ 100% | 1.24 | 1.35 | 1.36 | 1.30 |
| Rod Steps | | 713 steps | 882 steps | 484 steps |
| Discharged Water | | 14,802 gal | 12,887 gal | 10,009 gal |

TABLE II

| | Results of Load Follow Simulations at End of Fuel Cycle | | | |
|---|---|---|---|---|
| | Reference (equilibrium) | CAOC (SPINR) | CAOC (MINB) | Wide Band CAOC Xe Mode Control |
| Loss of Capacity | | 0.003 EFPH | 0 EFPH | 0 EFPH |
| Average Rapid Return to Power Capacity | | 97% | 95% | 95% |
| Minimum Margin @ 100% | 0.432 | 0.110 | 0.105 | 0.231 |
| Maximum $F_z$ @ 100% | 1.19 | 1.39 | 1.39 | 1.31 |
| Rod Steps | | 979 steps | 958 steps | 633 step |
| Discharged Water | | 42,889 gal | 39,621 gal | 24,077 gal |

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of automatically dampening xenon-135 spatial transients in the core of a pressurized water reactor having control rods which regulate reactor power level, comprising the steps of:

measuring the neutron flux in the reactor core at a plurality of axially spaced locations on a real-time, on-line basis;

repetitively generating from said neutron flux measurements, on a point-by-point basis, signals representative of the current axial distribution of xenon-135, and signals representative of the current rate of change of the axial distribution of xenon-135;

generating from said xenon-135 distribution signals and said rate of change of xenon distribution signals, control signals for reducing the xenon transients; and positioning the control rods as a function of said control signals, to dampen said xenon-135 spatial transients.

2. The method of claim 1 wherein said step of generating said control signal comprises the steps of generating a skewness signal as the difference between the weighted sums for the top half and bottom half of the reactor core of the point-by-point difference between the current xenon distribution signals and signals representative of the point-by-point xenon distribution at equilibrium at full power normalized to the weighted sum of the point-by-point xenon distribution at equilibrium at full power, generating a rate of change of skewness signal as the difference between the weighted sums for the top half and bottom half of the core of the point-by-point rate of change of axial distribution of xenon-135 signals normalized to the weighted sum of the point-by-point xenon distribution at equilibrium at full power and generating said control signal from a two dimensional comparison of said skewness and rate of change of skewness signals.

3. The method of claim 1 wherein the step of repetitively generating said point-by-point xenon-135 distribution signals comprises adding to the last value of the associated xenon-135 distribution signal, at time intervals which are short compared to the period of the xenon-135 transient, the product of the average value of the associated rate of change of xenon-135 signal over the said time interval times the time interval, and wherein the step of repetitively generating said point-by-point rate of change of xenon-135 distribution signals comprises generating point-by-point scaled iodine and power density signals from said flux measurements and subtracting from the sum of the current power density signal and scaled iodine signal the sum of the current xenon distribution signal and a scaled product of the current xenon distribution signal and the power density signal.

4. The method of claim 2 wherein the step of generating said control signal includes the step of inhibiting the generation of a control signal which would effect a change in control rod position for selected comparative values of said skewness signal and the rate of change of skewness signal.

5. The method of claim 4 wherein said selected comparative values of said skewness and rate of change of skewness signals include values for which a change in rod position would cause the rate of change of skewness signal to change polarity.

6. The method of claim 4 wherein said selected comparative values of said skewness and rate of change of skewness signals include values where the polarity of the skewness signal and the rate of change of the skewness signal are opposite except when the value of the rate of change of skewness signal exceeds the value of the skewness signal by a preselected factor.

7. The method of claim 4 wherein said selected comparative values of said skewness and rate of change of skewness signals include values of the skewness signal and rate of change of skewness signal below a preset threshold.

8. The method of claim 2 including the step of applying said skewness signal and said rate of change of skewness signal to a two dimensional visual display device to generate a visual phase plane diagram of the comparative values of said signals.

9. A method of generating a visual representation of the xenon-135 spatial transients in the core of a pressurized water reactor, comprising the steps of:

measuring the neutron flux in the reactor core at a plurality of axially spaced locations on a real-time, on-line basis;

repetitively generating from said neutron flux measurements on a point-by-point basis signals representative of the measured axial distribution of xenon-135 and of the rate of change of the measured axial distribution of xenon-135;

generating signals representative of the point-by-point full power, equilibrium distribution of xenon-135 for the level of core burnup;

repetitively generating a skewness signal representative of the difference between the weighted sums for the top half and bottom half of the core of the point-by-point difference between the measured axial distribution of xenon-135 signals and the full power, equilibrium distribution of xenon-135 signals normalized to the full power, equilibrium distribution of xenon-135 signals;

repetitively generating a rate of change of skewness signal as the difference between the weighted sums for the top half and bottom half of the core of the point-by-point rate of change of the measured axial power distribution of xenon-135 signals normalized to the sum of the point-by-point full power, equilibrium distribution of xenon-135 signals, and applying said skewness signal to one axis of a two dimensional visual display device and the rate of change of skewness signal to the orthogonal axis of the visual display device to generate a visual display of the trend in xenon-135 distribution in the core.

10. The method of claim 9 including the steps of generating a signal representative of a limit on the magnitude of said skewness signal, and applying said limit signal to the visual display device to generate on the visual display a visual indication of the limit in a manner which presents a visual comparison between the current value of the skewness signal and the limiting value.

11. The method of claim 10 including the step of positioning the control rods in response to the visual display in a manner which results in a reduction in the value of the displaced skewness signal.

12. The method of claim 11 wherein the step of applying said skewness signal and rate of change of skewness signal to the visual display device includes scaling said applied signals such that a trace generated by successive values of the applied signals for a xenon-135 oscillation of constant magnitude describes a circle on the display and in which the skewness signal is applied to the horizontal axis of the visual display device and the rate of change signal is applied to the vertical axis, each with a polarity such that insertion of the control rods results in a change in xenon-135 distribution which causes the trace to do down on the visual display and withdrawal causes the trace to go up.

13. The method of claim 12 including the step of generating signals which produce on the visual display an overlay over the trace generated by the skewness and rate of change of skewness signal which provides a visual indication of the comparative value of the skewness and rate of change of skewness signals for which adjustment should be made in the position of the control rods to reduce the skewing of the xenon-135 axial distribution and those for which no movement of the control rods is required.

14. The method of claim 9 wherein the time interval at which said xenon-135 axial distribution signals and rate of change of the xenon-135 axial distribution signals are generated is small compared to the period of the xenon oscillations and the step of generating the xenon-135 axial distribution signal comprises adding to the last value thereof the product of the average of the value of the last rate of change of xenon-135 signal and the current value thereof multiplied by the time interval between calculations, and wherein the step of generating the current rate of change of xenon-135 axial distribution signal comprises generating scaled iodine and power density signals from said flux measurements and subtracting from the sum of the current power density signal and scaled iodine signal the sum of the current xenon axial distribution signal and a scaled product of the current xenon axial distribution signal and the power density signal.

15. A method of generating a visual display of the core average axial distribution of xenon-135 in the core of a pressurized water reactor comprising the steps of:

measuring the core average neutron flux in the reactor core at a plurality of axially spaced locations on a real-time, on-line basis;

repetitively generating from said neutron flux measurements on a point-by-point basis, signals representative of the current core average, axial distribution of xenon-135; and applying said point-by-point xenon-135 distribution signals to a visual display device to generate a visual representation of the real-time, core average, axial distribution of xenon-135 in the reactor core.

16. The method of claim 15 including the steps of generating point-by-point signals representative of the core average, full power, equilibrium xenon-135 axial distribution and applying said core average, full power, equilibrium xenon-135 axial distribution signals to said visual display device to generate a visual display thereof and provide a visual comparison of the current xenon-135 distribution with the full power, equilibrium distribution.

17. The method of claim 15 including the steps of generating from said flux measurements point-by-point signals representative of the axial power distribution in the reactor core and selectively applying said axial power distribution signals to said display device in place of said xenon-135 distribution signals to generate a visual display of the current axial power distribution in the core.

18. The method of claim 17 including the steps of storing said axial power distribution signals for a selected interval of time and applying the axial power distribution signals stored for said selected interval of time to said visual display device together with the current axial power distribution signals to generate a display which provides a visual comparison of the current axial power distribution and the axial power distribution at said selected interval in the past.

19. The method of claim 18 including the steps of generating signals representative of a selected limit on axial power distribution and applying said limit signals together with the current axial power distribution signals to said display device to generate a display which provides a visual indication of the margin between the current axial power distribution and said limit.

20. The method of claim 19 wherein said limit is the limit on axial power distribution for a loss of coolant accident.

21. The method of claim 15 including the steps of generating from said flux measurement signals on a point-by-point basis signals representative of the current rate of change of the core average, axial distribution of xenon-135 in the reactor core, and selectively applying said rate of change signals to said visual display device in place of said xenon-135 distribution signals to generate a visual display of the axial distribution of the current rate of change in xenon-135.

22. Apparatus for controlling spatial transients in xenon-135 in the core of a pressurized water reactor having control rods which regulate reactor power level and reactor power spatial distribution, said apparatus comprising:
- means for measuring the neutron flux in the reactor core at a plurality of axially spaced locations;
- means for repetitively generating from said neutron flux measurements, on a point-by-point basis, current xenon-135 axial distribution signals and rate of change of xenon-135 axial distribution signals, and for generating therefrom a control signal for reducing the xenon transients; and
- means responsive to said control signal for positioning said control rods to reduce the xenon-135 transients.

23. The apparatus of claim 22 wherein said generating means generates a skewness signal as the difference between the weighted sums for the top and bottom halves of the reactor core of the point-by-point differences between the current xenon-135 axial distribution signals and a set of point-by-point equilibrium full power xenon-135 axial distribution signals normalized to the weighted sum of the point-by-point equilibrium full power xenon-135 axial distribution signals, and a rate of change of skewness signal as the difference in the weighted sums for the top and bottom halves of the core of the point-by-point rate of change of xenon-135 axial distribution signals normalized to the weighted sum of the point-by-point equilibrium full power axial distribution signals and generates said control signal from a two dimensional comparison of the skewness signal and the rate of change of skewness signal.

24. The apparatus of claim 23 wherein said generating means generates a control signal which calls for a change in the position of the control rods only for selected comparative values of said skewness and rate of change of skewness signal for which a change in control rod position would be effective to reduce the xenon-135 transient.

25. The apparatus of claim 24 including two dimensional visual display means and means for applying said skewness signal and rate of change of skewness signal to said visual display device to generate a visual indication of the comparative values thereof.

26. Apparatus for generating a visual indication of the trend of xenon-135 distribution in the core of a pressurized water reactor comprising:
- means for measuring the neutron flux at a plurality of axially spaced locations in the reactor core;
- means for generating from said neutron flux measurements signals representative of the xenon-135 axial distribution in the core and the rate of change of the xenon-135 axial distribution in the core; and
- display means responsive to the signals representative of the xenon-135 axial distribution and the rate of change thereof for generating a visual display of the trend in xenon-135 axial distribution.

* * * * *